United States Patent Office 3,467,563
Patented Sept. 16, 1969

3,467,563
METHOD OF PREPARING A COMPOSITION COMPRISING AN ADHEREND AND AN ADHESIVE LATEX MIXTURE
Colin P. Mason, Sarnia, Ontario, Canada, assignor to Polymer Corporation Limited, Sarnia, Ontario, Canada, a body corporate
No Drawing. Filed Mar. 28, 1967, Ser. No. 626,412
Claims priority, application Canada, Apr. 9, 1966, 957,632
Int. Cl. D04h 11/00; C09j
U.S. Cl. 156—72                8 Claims

ABSTRACT OF THE DISCLOSURE

A compositon is disclosed comprising an adherend, such as organic fibers in the form of tufts, and an adhesive latex mixture of a carboxyl-containing polymer. The polymer of the latex contains a major proportion by weight of conjugated alkadiene units and a minor proportion by weight of olefinically-unsaturated nitrile units, characterized in that in preparing said polymer at least one of the alkadiene and nitrile monomers has an olefinically-unsaturated group having at least one alkyl substituent. In a specific embodiment, the latex mixture further includes at least 100 parts of filler per 100 parts polymer content. One utility of the subject matter is in the fabrication of a tufted carpet having a solvent-resistant backing.

---

This invention relates to elastomeric compositions suitable for use as an anchoring base for fabrics. In particular, it relates to aqueous adhesive compositions prepared from carboxyl-containing nitrile polymers.

Aqueous dispersions of carboxyl-containing polymers such as carboxyl-containing butadiene-styrene rubber (SBR) have been used for backing tufted carpets. Such carpets are of recent development in that the individual tufts of organic fibers such as textile yarn are not anchored mechanically to the jute or Hessian fabric but require a binding composition to adhere the tufts in position.

Further advances in this art require that articles such as tufted carpeting have the additional feature of resistance to deterioration by oils and especially dry cleaning solvents. Carboxyl-containing SBR compositions fail in this property. Attempts to substitute conventional carboxyl-containing butadiene-acrylonitrile (NBR) in order to gain oil and solvent resistance has not met with success mainly because of a failure to develop sufficient strength of bonding in compositions having at least 100 parts filler loading. There has also been a need for such a composition to display the property known as "quick grab" i.e. the rapid development of bonding strength once applied, so that the carpeting may be more rapidly processed during fabrication.

It has now been found that these problems can be overcome be employing an adhesive composition based on a latex of a carboxyl-containing nitrile polymer in which the nitrile monomer units or the alkadiene monomer units are alkyl substituted. Such discovery is truly surprising in view of failures with standard carboxylic nitrile latices.

It is an object of this invention to provide improved compositions having the combined features of solvent resistance and improved adhesive strengths even when containing at least 100 parts of filler per 100 parts dry rubber content. Improved carpet backings, both of the primary and secondary types are specific objects. Laminated structures having improved adhesive compositions are other objects of my invention. Still further objects are improved methods of adhesion.

These and ohter objects are obtained in a solvent resistant composition, suitable for use as an anchoring base for fabrics, comprising an adherend and an adhesive latex of a carboxyl-containing polymer prepared from a monomer system comprising about 50 to 80 weight percent of conjugated alkadiene and 20 to 50 weight percent of an olefinically-unsaturated nitrile, the improvement wherein said monomer system contains at least one of said monomers having an olefinically-unsaturated group of the general formula

where R is hydrogen or $C_1$-$C_2$ alkyl and at least one R is alkyl. In a specific embodiment there is provided a composition consisting of organic fibers and an adhesive latex mixture bonding and fibers, said mixture comprising at least 100 parts by weight, per 100 parts by weight dry polymer, of a mineral filler; and an aqueous dispersion of a carboxyl-containing polymer of a conjugated alkadiene, methacrylonitrile and a copolymerizable $\alpha,\beta$ unsaturated carboxylic acid, said polymer containing between 20 to 45 weight percent nitrile units and 1 to 5 weight percent carboxylic acid units; and a latex thickening agent; said mixture having a viscosity of at least 5 poise. In other specific embodiment there is provided a method of bonding an adherend to a substrate which comprises treating the surface of said substrate with a solvent resistant adhesive composition comprising a mixture of a latex of a carboxyl-containing polymer prepared from a monomer system comprising about 50 to 80 weight percent of a conjugated alkadiene and 20 to 50 weight percent of an olefinically unsaturated nitrile, said a monomer system containing at least one of said monomers having an olefinically-unsaturated group of the general formula

where R is hydrogen or $C_1$-$C_2$ alkyl and at least one R is alkyl, and having a viscosity of at least 5 poise; assembling said adherend and treated substrate, and drying whereby a bond of improved strength is produced.

The carboxyl-containing polymer used to produce the improved composition of this invention is formed by acid pH emulsion polymerization of the alkadiene hydrocarbon monomer, the nitrile monomer and the unsaturated acid monomer under conditions such that the unsaturated acid is introduced into the polymer gradually. An anionic or ionic emulsifier is commonly employed and the polymerization initiated by a free-radical producing catalyst. The resulting latex emulsion may be then made alkaline to a pH of about 9–11. Such polymerization techniques and pH adjustments are known in the art and are not the subject of this invention.

The conjugated alkadiene hydrocarbon monomer may be one containing 4 to 8 carbon atoms especially the $C_4$-$C_6$ dienes, of which butadiene-1,3 is much preferred. When an alkyl substituent is required, the alkyl group may contain 1 to 2 carbon atoms, but the methyl substituent is preferred. Examples of alkyl-substituted butadiene which may be employed are isoprene, piperylene and 2,3-dimethyl butadiene-1,3, of which isoprene is preferred. Where desired, up to 10% of the alkadiene monomer may be substituted by a suitable vinylidene comonomer.

The olefinically-unsaturated nitrile is preferably formed from an $\alpha,\beta$-unsaturated carboxylic acid containing 3 to 6 carbon atoms and copolymerizable with the above diolefinic hydrocarbon monomer. They include acrylonitrile, crotonitrile and methylene glutaronitrile, of which acrylonitrile is preferred. When an alkyl substituent is required, the alkyl group may contain 1 to 2 carbon atoms, examples of such monomers being methacrylonitrile and ethacrylonitrile.

The carboxyl group is introduced into the polymer structure as is known in the art by acidic monomer(s) which contain at least one carboxy group per molecule, and include acrylic acid, itaconic acid and various alkyl substituted derivatives in which the alkyl group contains 1–8 carbon atoms, for example, methacrylic and ethacrylic. Others such as 2-cyanoethacrylic or alpha chloroacrylic acid may be used. Methacrylic acid has been found to be particularly useful.

When desired, other methods of preparing carboxyl-containing polymers may be employed. Such known methods include reacting a carboxyl-supplying agent such as maleic acid or thioglycollic acid or anhydride thereof with a non-carboxyl-containing alkadiene/nitrile copolymer.

The proportions of the three monomers used to prepare the composition in this invention are in general determined by the properties required in the final application of the composition. In general, the major component will be the conjugated alkadiene and the level of the nitrile and carboxylic acid components will be adjusted depending on the required properties which particularly include: solvent resistance, resistance to thermal and oxidative degradation and the desired level of adhesive strength. One preferred composition useful for adhering textile fabrics to form a permanently bonded article is one containing the polymer of isoprene-acrylonitrile-methacrylic acid in the weight percent ratio of 62/35/3. Proportions of acrylonitrile between 20 and 45 weight percentage are useful but preferred are those proportions of acrylonitrile between 25 and 40 weight percentage. Another composition, particularly useful in carpet backings, is based on the polymer of butadiene-methacrylonitrile-methacrylic acid containing about 1.5 to 2 of diene monomer units per nitrile monomer and 2 to 3 parts by weight per 100 parts total monomer of methacrylic acid. The proportions of the carboxylic acid component found to be useful in the present invention are usually less than 10 weight percentage and preferably between 1 to 5 weight percentage.

The carboxyl-containing nitrile latex used in this invention will usually have a polymer content in excess of 40 weight percent and where desired may be concentrated to solids content of the order of 60% by conventional processes. The latex may then be compounded using techniques and ingredients of the art. One or more antidegradants, in amounts of 1 to 2 parts, should be incorporated to enhance ageing properties. Suitable mineral fillers, especially light coloured fillers, are readily blended with and accepted by this latex in amounts as high as 100 to 400 parts per 100 parts latex polymer solids. Such filler addition should be accompanied by the customary addition of a stabilizing agent such as is known in the art, for example, an inorganic phosphate, sodium hexametaphosphate or tetrapotassium pyrophosphate. Clays, whiting (calcium carbonate), colloidal silica, hydrated alumina, titanium dioxide (or even carbon black where use permits), may be used as fillers. Specific formulations may include minor amounts of other compatible polymer latices, resin emulsions, fungicides, or various additives as the art may desire. A conventional latex thickening agent especially of synthetic origin, for example, hydroxy ethyl cellulose, sodium carboxymethylcellulose, a sodium-, ammonium-, or potassium-polyacrylate, or polyvinylalcohol, should be added to adjust the viscosity of the compound latex to over 5 poises in viscosity at 25° C., the level depending upon the specific application.

The crosslinking or vulcanization of carboxyl-containing latices is well known in the art, a preferred means being the use of a polyvalent metal cation such as with zinc oxide. Other methods of employing a polyamine containing at least two amino- or imino-nitrogen groups, or using an alkali metal aluminate such as sodium aluminate may also be used where desired. Temperatures in the range of 70–200° C. are suitable although an initial partial vulcanization may be conveniently undertaken at room temperature.

Resistance to discolouration on ageing is another property in which the compositions of this invention excel. Such property is important for example when such latex is used only after several months of shipping and storing. The brownish discolouration experienced with conventional carboxylated nitrile latex compositions is much reduced or even avoided by the carboxyl-containing latex compositions of this invention.

The term "non-woven fabric" where used herein is used with its accepted meaning as a textile structure consisting of a web or mat of intertwined fibers.

The term "adherend" is defined as a body which is held to another by an adhesive. The term "substrate" is defined as a material upon the surface of which an adhesive-containing substance is spread for any purpose such as bonding or coating.

The term "solvent resistant" as used herein is understood to mean resistance to deterioration by aliphatic solvents and to dry cleaning solvents such as perchloroethylene.

The superior adhesive attribultes of the compositions of the present invention may be readily characterized by means of the adhesive peel test using the following procedure. A piece of cotton duck fabric 23 by 51 centimeters is covered by a thin layer of the adhesive composition. The adhesive composition is spread uniformly on the cotton fabric by drawing across the fabric a smooth steel bar, whose clearance above the fabric is adjusted by means of spacers contacting the fabric edges in regions not covered by the adhesive composition. The thickness of adhesive composition spread on the fabric is not critical and a thickness corresponding to 152 grams per square meter of dry adhesive composition has been found to be useful. A second piece of cotton duct, also 23 x 51 centimeters, is laid uniformly on top of the first piece of coated fabric. On top of this laminate is placed a piece of 2 centimeters thick plywood, of the same dimensions as the fabric, and on the plywood is placed a weight of 900 grams. Five minutes after placing the weight on the laminate, it is removed and the uncovered laminate permitted to dry partially at room temperature for at least 16 hours. The cotton-cotton adhering laminate is then heated for ten minutes at 122° C.

The adhesive strength of the laminate is measured by cutting a strip of the laminate 15.2 by 2.5 centimeters and by pulling apart at 180° direction the two cotton fabric substrates in a conventional tensile testing instrument at a rate of separation of 2.54 centimeters per minute. The results are reported as grams per centimeter width.

To test the application of the inventive composition as a carpet-backing, a section of unbacked carpet was tented on a small frame, the latex-containing compound spread thereon. After allowing to dry, the tuft-pull was measured on a conventional Instron tester and the value reported as grams per tuft.

Applications wherein the compositions of this invention may be used include carpet-backing, paper-board coatings, laminates of woven textile fabric, non-woven textile fabrics, doubling adhesive, paper saturation and rubberized-hair for use in oil or air filters.

The following examples illustrate preferred ways of preparing the compositions and performing the processes of the present invention.

EXAMPLE I

Six carbonyl-containing polymer latices were prepared in a conventional emulsion polymerization recipe employing 3 parts alkyl aryl sulphonate emulsifier and 2 parts alkyl aryl polyether sulphonate emulsifier per 100 total parts by weight monomer. The monomer system consisted of isoprene, acrylonitrile and methacrylic acid in the proportion by weight shown in Table I. The polymerization was conducted at 40° C. and carried to 95% conversion.

The resulting latex in each case had a total solids content of the order of 45%. After unreacted monomers were removed by vacuum distillation, the pH of the latex was adjusted to 9.0 by addition of concentrated ammonia solution.

To each latex was then added 5.0 parts of zinc oxide as an aqueous dispersion, 1.0 part of an antioxidant (said to contain a polyalkyl polyphenol and available under the trademark Agerite Superlite), and sodium polyacrylate to adjust the viscosity to 12 poise, said parts being parts per 100 parts latex solids.

Each latex composition was then used as an adhesive to prepare a cotton-cotton laminate by the procedure heretofore described.

Seven control latices were also prepared in the above recipe but using butadiene-1,3 in place of the isoprene, and adhesive compositions likewise prepared and tested in cotton-cotton laminates.

In addition there were prepared and similarly tested two further compositions shown in Table I as trial #7 (in which isoprene was replaced by piperylene) and trial #8 (in which acrylonitrile was replaced by methacrylonitrile).

The results are tabulated in Table I and show that the compositions of this invention had in each trial at least double the adhesive strength over that of the conventional compositions. Since industrial requirements in many applications desire a bond strength of at least about 1000 grams per centimeter width in such compositions, it can readily be seen that the conventional control compositions would barely meet this requirement whereas the compositions of this invention provide a highly significant improvement.

TABLE I

| Trial No. | Monomer proportion (parts) | | | Adhesive strength, grams per centimeter of adhesive surface width | Adhesive strength of control samples using butadiene-1,3 instead of isoprene |
|---|---|---|---|---|---|
| | Isoprene | Acrylonitrile | Methacrylic acid | | |
| 1 | 64 | 35 | 1 | 2,520 | C-1, 947 |
| 2 | 63 | 35 | 2 | 2,445 | C-2, 1,160 |
| 3 | 62 | 35 | 3 | 2,285 | C-3, 1,090 |
| 4 | 59 | 40 | 1 | 2,360 | C-4, 858 |
| 5 | 57 | 40 | 3 | 2,855 | C-5, 1,090 |
| 6 | 54 | 45 | 1 | 1,965 | C-6, 590 |
| | Piperylene | Acrylonitrile | | | |
| 7 | 65 | 33 | 2 | 2,140 | C-2, as above |
| | Isoprene | Methacrylonitrile | | | |
| 8 | 58.0 | 40.0 | 2 | 3,130 | C-7, 894 |

EXAMPLE II

Further latices were prepared according to a conventional polymerization recipe and operating at 49° C. to 95% conversion. The monomer system consisted of butadiene-1,3, methacrylonitrile, and methacrylic acid in the weight proportion shown in Table II.

Unreacted monomer remaining in the latex was removed by distillation under reduced pressure. The pH of each latex was adjusted to a pH of 9 with concentrated ammonia.

The latices so produced were then compounded in the following formulation, then laminates of cotton duck were prepared as for Example I and the adhesive strength determined. The results are listed in Table II.

```
                                              "Dry" parts
Latex _____ 100.
Zinc oxide (aqueous dispersion) ____ 5.
Antioxidant (Agerite Superlite) ____ 1.
Non-reinforcing filler (a common
  grade of whiting available under
  the trademark "Pulpro White") ___ 0, 200 and 400 as
                                       per Table II.
Powdered sodium phosphate-type glass
  sold under the trademark of Calgon_ 0.25 per 100 parts
                                       Pulpro White.
Sodium polyacrylate as required to ad-
  just viscosity to 12 poise.
```

TABLE II

| | Experimental | | Control | |
|---|---|---|---|---|
| | Butadiene-1,3 | 53.3 | Butadiene-1,3 | 58.6 |
| | Methacrylonitrile | 43.7 | Acrylonitrile | 38.4 |
| | Methacrylic acid | 3 | Methacrylic acid | 3 |
| Adhesion of Cotton-Cotton-Laminate (grams per centimeter width): | | | | |
| (a) No filler | 3,200 | | 1,100 | |
| (b) With 200 parts filler | 1,695 | | 222 | |
| (c) With 400 parts filler | 928 | | <200 | |

Similar composition using the above latices but without the whiting filler were prepared and used to prepare a laminate of heavy kraft paper and aluminum foil. The bond of the adhesive tended to be greater than the tear strength of the paper, but on those test strips with which the paper did not tear first, peel strengths of 358 grams per centimeter width for the experimental compositions but only 142 grams per centimeter width for the control composition were found.

In another variation, adhesion of a cotton-to-cotton laminate composition prepared using a latex of isoprene/methacrylonitrile/methacrylic acid in the weight ratio of 67/30/3, containing no filler, revealed a peel strength of 1605 grams per centimeter width.

EXAMPLE III

Six compositions of this invention were evaluated as latex carpet-backings and compared to compositions based on carboxyl-containing butadiene-1,3/acrylonitrile latex. The latices were prepared in the polymerization formulation of Example II using the monomer weight ratios shown in Table III. The compounding was performed as for Example II except that sufficient sodium polyacrylate was used to adjust the viscosity to 300 poise, and 5 parts titanium dioxide was used instead of 5 parts zinc oxide.

The compounded latex was applied as a primary backing to tufted carpet fabric, dried at 122° C., matured for 16 hours, and the strength of tuft anchoring was measured by an Instron tester as the force required to pull loose or dislodge a tuft from the carpet.

The carpet was also flexed 180° several times by hand to observe the ability to withstand deterioration by cracking by flexing.

In another test, a portion of each carpet was exposed to perchloroethylene and its condition on removal noted.

Yet another test was applied using specimens prepared with secondary backing. This test known in the art as "quick grab" is associated with the ability to develop rapid bonding strength. The adhesive compositions contained 200 parts whiting and were adjusted to a viscosity before application of 400 poise with sodium polyacrylate. Specimens were prepared by coating carpet fabric with latex composition and applying a bottom layer of jute by means of a roller. The test specimens were examined for peel strength after only 5 minutes of cure time at 122° C. Although carboxyl-containing latices having up to 250 grams per centimeter "quick grab" are presently available to the industry, a needed improvement in "quick grab" property to a level of 350 to 500 grams per centimeter has been expressed.

The results of these evaluations are shown in Table III from which the superior properties of the inventive compositions are readily noted. As to the tests in perchloroethylene, it was observed that even with the high filler loading, the compositions of this invention showed no tendency to separate or shed filler, and thus possessed the desired ability to be dry-cleaned safely.

By way of further control references, a carboxylated-SBR latex of good quality in comparable carpet backing formulation had a "quick grab" value of 223 grams per centimeter, a tuft-pull at 200 parts filler of 4540–5450 grams, and a filler tolerance (i.e., the quantity of filler which can be incorporated before flex-cracking appears) of 360 parts whiting. Thus it can be seen that compositions based on conventional carboxylated-NBR latex fail to equal those of commercially accepted carboxylated-SBR latex compositions; yet compositions based on the carboxylated nitrile latex of this invention are equal to or better than those compositions of carboxylated-SBR in adhesion tests, and in addition have the feature of solvent resistance desired in carpet-type articles such as sanitized door pads, dry-cleanable public carpeting and airplane carpeting.

mineral filler per 100 parts by weight of polymer of said latex; said mixture further containing a latex thickening agent and having a viscosity of at least 5 poise at 25° C.; assembling said adherend and treated substrate, and drying, whereby a bond of improved strength is produced.

2. The method of claim 1 which further includes the step of essentially cross-linking said carboxyl groups of said polymer with the aid of the cations of a polyvalent metal.

3. The method of claim 1 wherein there is bonded a laminate of at least two surfaces.

4. The method of claim 1 wherein the adherend in the form of tufts of textile is bonded to a backing by said solvent-resistant latex mixture, whereby a tufted carpet of improved properties is produced.

5. The method of claim 1 wherein said olefinically-unsaturated nitrile is methacrylonitrile.

6. The method of claim 5 wherein said alkadiene is at least one of butadiene-1,3 or isoprene.

7. The method of claim 1 wherein said alkadiene is isoprene.

8. The method of claim 1 wherein the amount of filler in said latex mixture is from about 200 to about 400 parts by weight of mineral filler per 100 parts by weight of polymer in said latex.

TABLE III

|  | Experimental A | | Experimental B | | Experimental C | | Control | |
|---|---|---|---|---|---|---|---|---|
| Polymer Composition (parts by weight): | | | | | | | | |
| Butadiene-1,3 | 60 | 53 |  |  |  |  | 65 | 58.6 |
| Isoprene |  |  | 68 | 63.5 | 67 | 62 |  |  |
| Acrylonitrile | 37 | 44 |  |  |  |  | 32 | 38.4 |
| Methacrylonitrile |  |  | 29 | 33.5 | 30 | 35 |  |  |
| Methacrylic Acid | 3 | 3 | 3 | 3 | 3 | 3 | 3 | 3 |
| Primary Carpet Backing, Tuft Pull (grams per tuft): | | | | | | | | |
| At 100 parts filler loading | 4,900 | 5,220 | 3,900 | 4,300 | N.P.[1] | N.P. | 1,950 | 1,810 |
| At 200 parts filler loading | 5,040 | 5,040 | 3,630 | 5,260 | 4,300 | 6,620 | 1,950 | 2,040 |
| At 400 parts filler loading | 3,040 | 3,170 | 2,580 | 1,950 | N.P. | N.P. | <1,800 | <1,800 |
| Ability to flex without cracking | Pass | Pass | Pass | Pass | Pass | Pass | Fail | Fail |
| Secondary Carpet Backing, Quick grab (grams per centimeter width) | 402 | 804 | 536 | 402 | 804 | 580 | 222 | 45 |

[1] N.P.=Not prepared.

What is claimed is:

1. A method of bonding an adherend to a substrate which comprises treating the surface of said substrate with a solvent-resistant latex adhesive composition comprising a mixture of latex of a carboxyl-containing polymer prepared from a monomer system comprising from about 50 to 80 percent of a conjugated alkadiene, from about 20 to 50 percent of an olefinically unsaturated nitrile, and from about 1 to 5 percent of an α,β-unsaturated carboxylic acid, said percent being percent by weight based on a total of 100 parts of all monomers, at least one of said alkadiene and nitrile monomers having an olefinically unsaturated group having the formula

wherein R is selected from hydrogen and a $C_1$–$C_2$ alkyl radical and at least one R is alkyl, incorporating in said latex mixture at least 100 to 400 parts by weight of

References Cited

UNITED STATES PATENTS 2,961,348   11/1960   Finnegan et al.
3,061,883   11/1962   Frank.
3,332,797   7/1967   Strasser.

OTHER REFERENCES

"Carboxylic Elastomers," Brown et al.: Industrial and Engineering Chemistry, vol. 47, No. 5, pp. 1006–1012 relied on.

MORRIS LIEBMAN, Primary Examiner

SAMUEL L. FOX, Assistant Examiner

U.S. Cl. X.R.

117—161; 156—331; 260—41.5